United States Patent [19]

Hoggard et al.

[11] 4,359,844
[45] Nov. 23, 1982

[54] BIRD PROTECTION APPARATUS

[75] Inventors: Julius M. Hoggard; James L. Lane, both of Salt Lake City, Utah

[73] Assignee: Utah Power & Light Co., Salt Lake City, Utah

[21] Appl. No.: 155,578

[22] Filed: Jun. 2, 1980

[51] Int. Cl.³ .............................................. A01K 3/00
[52] U.S. Cl. ........................................ 52/101; 52/741
[58] Field of Search ...................... 52/101, 712, 741; 174/5 R

[56] References Cited

U.S. PATENT DOCUMENTS 3,407,550 10/1968 Shaw ...................................... 52/101
4,110,943 9/1978 Carlson .................................. 52/101

Primary Examiner—Carl D. Friedman
Attorney, Agent, or Firm—Terry M. Crellin; B. Deon Criddle

[57] ABSTRACT

A device for installation on the crossbar of an electrical power pole to prevent birds from landing on the crossbar and accidentally electrocuting themselves by touching adjacent power lines supported by the crossbar. The device comprises a generally "U"-shaped bracket member adapted to fit around the girth of the crossbar, with a planar framework attached to the upper leg of the bracket so as to extend upwardly from the crossbar when the bracket is fitted around the crossbar. The free end of the upper leg of the bracket has lip extending outwardly and upwardly therefrom, and an elongate bar having one end bent back over itself to form a hook is positioned with hook fitting over the lip. The elongate bar closes the crossbar within the bracket and means are provided for securely attaching the lower end of the elongate bar to a lug or ear extending outwardly and downwardly from the lower leg of the bracket member. The device is readily installed by two linemen using hotsticks from a position below the crossbar so that the power lines carried by the crossbar need not be de-energized during the installation of the device.

5 Claims, 3 Drawing Figures

BIRD PROTECTION APPARATUS

BACKGROUND OF THE INVENTION

1. Field

The invention pertains to devices which are installed on crossbars of electrical power pole to discourage birds from landing on the crossbars and accidentally electrocuting themselves by touching adjacent power lines supported by the crossbar.

2. State of the Art

Birds are attracted to the crossbars of electrical power poles as convenient perches. Large birds, such as eagles, hawks, owls, etc. have wingspans which are capable of extending between adjacent power lines supported on the crossbar. When the large bird lands on the crossbar, its wings are extended parallel to the crossbar and in many instances simultaneously touch the adjacent power lines resulting in accidental electrocution of the bird. It has been proposed to place obstructions on the crossbars to deter the birds from using the crossbars as perches. Planor, framework structures in the shapes of rectangles or triangles which are attached to the crossbar and extend upwardly from the upper surface of the crossbar have been found effective in preventing large birds which are subject to accidental electrocutions from attempting to land and perch on the crossbars. Heretofore, the framework structures have been attached directly to the crossbars. Working directly on the crossbars requires that the powerlines carried thereon be de-energized or dead to prevent accidentally harming those persons working on the crossbar.

OBJECTIVE

A principal object of the present invention is to provide a framework structure having a novel bracket means incorporated therewith whereby two linemen working in conjunction from the pole somewhat below the crossbar and using hotsticks can install the bracket and associated framework structure to the crossbar without requiring de-energizing of the power lines carried by the crossbar.

SUMMARY OF THE INVENTION

The above objective is achieved by a device comprising a generally "U"-shaped bracket member adapted to fit around the girth of the crossbar with the base of the bracket member positioned along one lateral side of the crossbar and with the upper and lower legs of the bracket member positioned along the top and bottom sides of the crossbar, respectively. A lug or ear extends outwardly and downwardly from the free end of the lower leg of the bracket member, and a lip extends outwardly and upwardly from the free end of the upper leg of the bracket member. A planar framework structure is firmly attached to the upper leg of the bracket such that when the bracket member is installed on a crossbar, the framework member is in the same plane as the crossbar and extends upwardly from the top surface of the crossbar.

One of the linemen on the pole holds the framework structure and associated bracket with a hotstick and positions the bracket around the girth of the crossbar. The second lineman holds an elongate bar at the end of a hotstick. The elongate bar has one of its ends bent back over itself to form a hook which is adapted to fit over the lip on the upper leg of the bracket member. The second lineman positions the hooked end of the elongate bar over the lip on the upper leg of the bracket member and the other end of the elongate bar is then secured by appropriate means to the lug or ear which extends from the free end of the lower leg of the bracket.

Additional objects and features of the present invention will become apparent from the following detailed description of the invention taken in conjunction with the accompanying drawings.

THE DRAWINGS

A preferred embodiment of the device of the invention representing the best mode presently contemplated of carrying out the invention is illustrated in the accompanying drawings, in which.

DETAILED DESCRIPTION OF THE ILLUSTRATED EMBODIMENT

Figure 1:
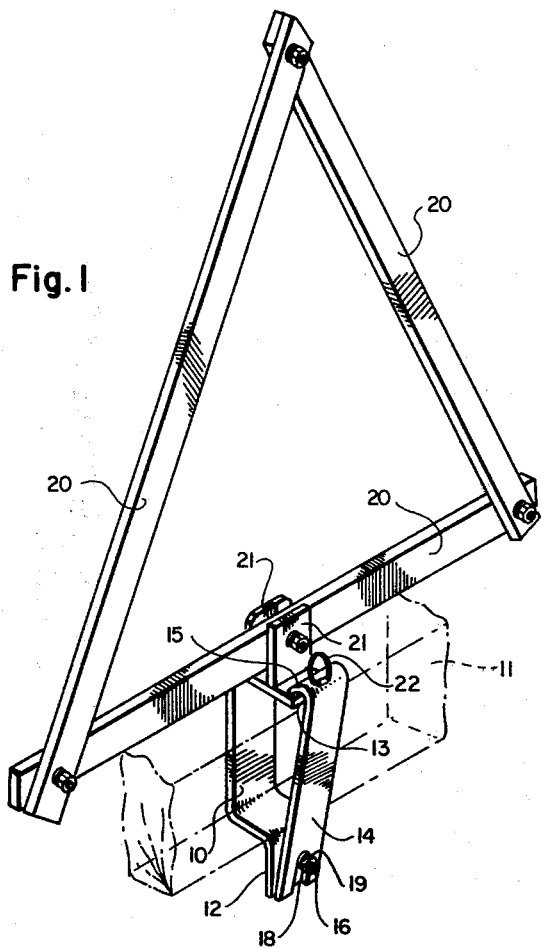
FIG. 1 is pictorial view of the device of the invention showing in phantom a portion of the crossbar to which the device is attached.
Figure 2:
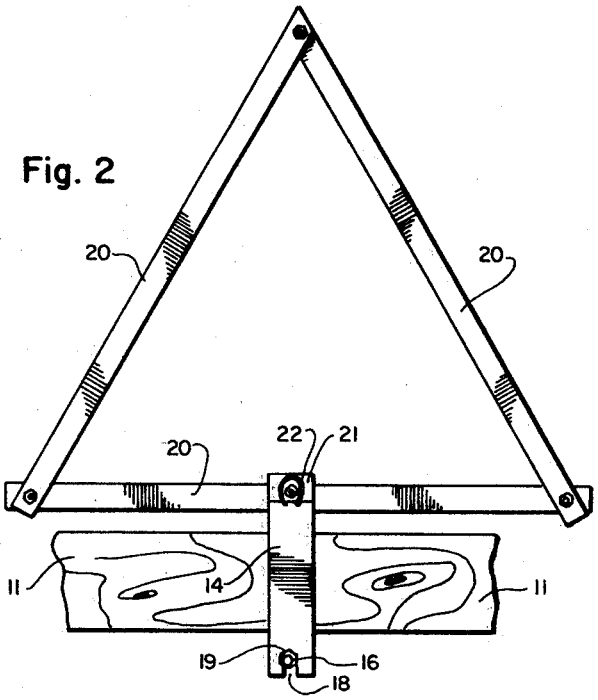
FIG. 2 is a vertical elevation of the device shown in FIG. 1.
Figure 3:
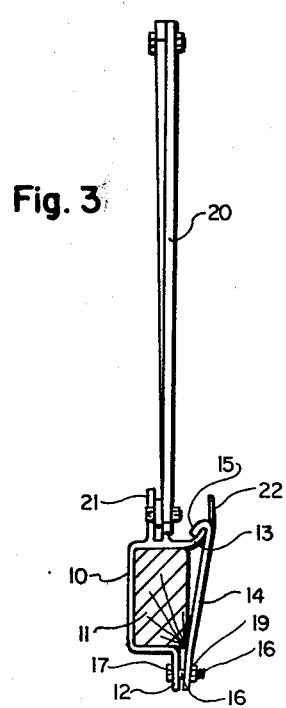
FIG. 3 is an end view of the device shown in FIG. 1.

A preferred embodiment of the device of the present invention, as illustrated, comprises a generally "U"-shaped bracket member 10 which, as shown, is adapted to fit around the girth of a crossbar 11 on an electrical power line pole (not shown). The base of the bracket member 10 is adapted to be positioned along one lateral side of the crossbar 11, with the upper and lower legs of the bracket member 10 positioned along the top and bottom sides, respectively, of the crossbar 11. A lug or ear 12 extends outwardly from the free end of the lower leg of the bracket member 10 so as to project downwardly from the bottom side of the crossbar 11 when the bracket is positioned on the crossbar, and a lip 13 extends outwardly from the free end of the upper leg of the bracket member 11 so as to project upwardly from the top of the crossbar 11 when the bracket is positioned on the crossbar. The upper leg of the bracket member 10 is preferably at least of sufficient length so as to extend across the full width of the top side of the crossbar 11 with the lip 13 extending beyond the edge of the crossbar 11. The lower leg of the bracket member is preferably shorter than the width of the bottom side of the crossbar 11 as is best shown in FIG. 3.

An elongate bar 14 is provided havine one end thereof bent back over itself to form a hook 15 at that end. The hook 15 is adapted to fit over the lip 13 on the upper leg of the bracket member 13. Means are provided for attaching the other end of the elongate bar 14 to the lug or ear 12 extending from the free end of the lower leg of the bracket member 10. As illustrated, a threaded stud 16 extends outwardly from the lug or ear 12 in a direction generally away from the base of the bracket 10. The stud 16 is advantageously formed by a bolt which extends through an opening in the lug or ear 12, with the head end 17 (FIG. 3) of the bolt being welded to the lug or ear 12. The end of the elongate bar 14 which is to be attached to the lug or ear 12 has a slot 18 extending inwardly along the longitudinal axis of the bar 14, whereby the slot is adapted to be positioned over and to receive the threaded stud 16 therethrough when the hooked end 15 of the elongate bar is fitted over the lip 13 on the free end of the upper leg of the bracket means 10. A nut 19 is threaded on the stud 16 and is adapted to be cinched up tight against the slotted end of the elongate bar 14 so that the bar securely engages the crossbar 11 and constrains the crossbar 11 within the bracket means 10.

A planar framework member 20 is attached to the upper leg of the bracket member 10 such that when the bracket member 10 is installed on the crossbar 11, the framework member 20 extends upwardly from the crossbar 11 in the same plane as the crossbar 11. The framework member 20 preferably has the shape of a triangle, with one side of the triangle attached between its ends to the upper leg of the bracket member 10. As illustrated, attachment lugs 21 extend upwardly from the upper leg of the bracket member 10. The lugs 21 are spaced so as to receive the side of the framework member 20 therebetween. The side of the framework member 20 is held securely between the lugs 21 by a nut and bolt which extend through the lugs 21 and the side of the framework member 20. The framework can be shaped as a square, rectangle or other polygon; however, the triangular shape has been found to be very effective in safely preventing large birds from perching on the crossbars to which the framework has been attached, while at the same time being somewhat easier to install than other shaped framework members. As illustrated, the triangular framework member 20 is conveniently formed from three elongate, rigid bars connected at adjacent ends to form a triangle. The ends of the bars are connected together with nuts and bolts as shown. The bars are advantageously made of molded fiberglass which is resistant to weathering and a nonconductor of electricity. The framework member can be formed of other nonconducting materials such as wood or other organic polymeric materials such as polyethylene, nylon, etc. The bracket member 10 and elongate bar 14 are made of metal which has been given a protective coating such as zinc.

The device of the present invention is readily installed on the crossbar of a power line pole by two linemen working from the pole a short distance below the crossbar. The linemen use hotsticks in installing the device, and the electrical lines supported by the crossbar need not be de-energized while the device is being installed. One of the linemen holds the framework member 20 and attached bracket member 10 at the end of a hotstick and positions the device so that the bracket member 10 is fitted around the crossbar 11. The second lineman holds the elongate bar 14 at the end of a hotstick and positions the hooked end 15 of the bar 14 over the lip 13 on the bracket member 10 while simultaneously sliding the slot 18 in the other end of the bar 14 around the threaded stud 16. Preferably, the nut 19 is engaged or the threads at the end of the threaded stud when the bar 14 is installed, with the slotted end of the bar 14 being fitted between the ear or lug 12 of bracket member 10 and the nut 19 as the slot 18 about the threaded stud 16. When the bar 14 is so positioned, the second lineman releases his hotstick from the bar and threads the nut tightly against the slotted end of the bar 14. As the nut 19 is cinched up against the slotted end of bar 14, the bar 14 makes secure contact with the lower corner of the crossbar 11 and forces crossbar 11 into secure and tight engagement with the bracket member 10. Once the nut 19 has been tightened, the first lineman can release his hotstick from the device, and the lineman climb down the pole.

The bar 14 preferably has a wire loop 22 attached to and extending from the bent back portion of the hooked end 15 of the bar 14. The loop 22 can easily be grabbed with the hotstick so that the bar can be guided to its position with its upper end hooked over the lip 13 of bracket member 10 and with the slotted lower end thereof fit over the stud 16 and between the ear or lug 12 of the bracket member 10 and the nut 19 threaded on the end of stud 16.

It is to be understood that the present disclosure, including the detailed description of the preferred embodiment of the invention, is made by way of example and that various other embodiments are possible without departing from the subject matter coming within the scope of the following claims, which subject matter is regarded as the invention.

I claim:

1. A device for installation on the crossbar of an electrical power pole to prevent birds from landing on the crossbar and accidentally electrocuting themselves by touching adjacent power lines supported by the crossbar, said device being adapted for installation on said crossbar by linemen using hotsticks so that the electrical lines supported by the crossbar need not be deenergized while the device is being installed on the crossbar, said device comprising:

a generally "U"-shaped bracket member adapted to fit around the girth of the crossbar, said bracket member comprising a base member and upper and lower legs, said base member being adapted to be positioned along one lateral side of the crossbar with said upper and lower legs extending from said base member and adapted to be positioned along the top and bottom sides of the crossbar, respectively;

a lug or ear extending outwardly and downwardly from the free end of the lower leg of said bracket member;

a lip on the free end of said upper leg of said bracket member;

an elongate bar having one end bent back over itself to form a hook at said one end, said hook being adapted to fit over said lip on the upper leg of said bracket member;

means for attaching the other end of said elongate bar to the lug or ear which extends downwardly from the free end of the lower leg of said bracket member; and a planar framework member attached to the upper leg of said bracket member such that when the bracket member is installed on a crossbar, the framework member is in the same plane as the crossbar and extends upwardly from the crossbar.

2. A device in accordance with claim 1, wherein the elongate bar has a wire loop extending from the hook at said one end thereof such that the elongate bar can be grabbed with a hotstick and placed over the lip on said "U"-shaped bracket as the "U"-shaped bracket is held in place about the crossbar by another hotstick.

3. A device in accordance with claim 1, wherein the means for attaching the other end of said elongate bar to the lug or ear which extends downwardly from the free end of the lower leg of said bracket member comprises:

a threaded stud which extends outwardly from the lug or ear;

a slot extending inwardly from the other end of said elongate bar, said slot being adapted to receive said threaded stud therethrough when the hooked end of said elongate bar is fitted over the lip on the free end of the upper leg of said bracket member; and a nut which is threaded on said stud is adapted to be cinched up tight against the slotted end of said elongate bar.

4. A device in accordance with claim 1, wherein the planar framework has the shape of a triangle, with one side of the triangle attached to the upper leg of said bracket member.

5. A method of attaching a device on the crossbar of an electrical power pole using hotsticks wherein the device comprises a generally "U"-shaped bracket member adapted to fit around the girth of the crossbar, with a planar framework attached to the upper leg of the bracket so as to extend upwardly from the crossbar when said bracket member is fitted around the crossbar, said method comprising:

holding the planar member with a hotstick and positioning the bracket member around the crossbar;

securing an elongate bar having one end bent back over itself to form a hook at said one end with a second hotstick and placing the hooked end of the elongate bar over an upwardly extending lip on the free end of the leg of said bracked adjacent to the upper surface of the crossbar; and securing the lower end of said elongate bar to a lug or ear extending downwardly from the free end of the leg of said bracket adjacent to the lower end of said crossbar.

* * * * *